United States Patent
Traficante et al.

(10) Patent No.: US 10,774,224 B2
(45) Date of Patent: Sep. 15, 2020

(54) UNOBTRUSIVE MARKINGS USING A CHLOROPHYLL-BASED AGENT

(71) Applicants: Gabriel Traficante, Buenos Aires (AR); Juan Ignacio Gerardo Cecchetto Dasso, Buenos Aires (AR)

(72) Inventors: Gabriel Traficante, Buenos Aires (AR); Juan Ignacio Gerardo Cecchetto Dasso, Buenos Aires (AR)

(*) Notice: Subject to any disclaimer, the term of this patent is extended or adjusted under 35 U.S.C. 154(b) by 254 days.

(21) Appl. No.: 15/691,168

(22) Filed: Aug. 30, 2017

(65) Prior Publication Data

US 2018/0007837 A1   Jan. 11, 2018

Related U.S. Application Data

(63) Continuation-in-part of application No. PCT/US2016/024930, filed on Mar. 30, 2016.

(51) Int. Cl.

| | |
|---|---|
| *C09D 7/41* | (2018.01) |
| *G09F 19/12* | (2006.01) |
| *A01G 7/06* | (2006.01) |
| *G09F 19/14* | (2006.01) |
| *A01G 13/02* | (2006.01) |
| *G09F 19/22* | (2006.01) |
| *G09F 23/00* | (2006.01) |

(Continued)

(52) U.S. Cl.
CPC .............. *C09D 7/41* (2018.01); *A01D 34/835* (2013.01); *A01G 7/00* (2013.01); *A01G 7/06* (2013.01); *A01G 13/02* (2013.01); *B44C 1/222* (2013.01); *B44F 7/00* (2013.01); *C09D 5/00* (2013.01); *C09D 5/14* (2013.01); *C09D 157/10* (2013.01); *G09F 19/12* (2013.01); *G09F 19/14* (2013.01); *G09F 19/22* (2013.01); *G09F 19/228* (2013.01); *G09F 23/0066* (2013.01); *A63C 19/065* (2013.01)

(58) Field of Classification Search
CPC ........ E01C 13/00; E01C 13/08; E01C 13/083; A63C 19/00; A63C 19/065; G01C 21/00; C09D 7/00; C09D 7/41
USPC ............................ 472/85–94; 428/15, 17, 22
See application file for complete search history.

(56) References Cited

U.S. PATENT DOCUMENTS

| | | | | |
|---|---|---|---|---|
| 8,190,360 | B2* | 5/2012 | Davis ................ | G06Q 30/0241 347/111 |
| 2013/0034671 | A1* | 2/2013 | George ................... | D01F 1/04 428/17 |

* cited by examiner

*Primary Examiner* — Kien T Nguyen
(74) *Attorney, Agent, or Firm* — Allen D Hertz, P.A.; Allen D Hertz

(57) ABSTRACT

An improved advertising system can include a location having a substantially large expanse of living greenery, a predetermined design for an advertisement, and a chlorophyll-based agent. The location can be observable by viewers at a predefined minimum viewing distance. The chlorophyll-based agent can be used to paint the predetermined design on the living greenery. The chlorophyll-based agent can be non-detrimental to the health of the living greenery. The predetermined design painted on the living greenery with the chlorophyll-based agent can be only viewable by viewers at the predefined minimum viewing distance. Living greenery treated with the chlorophyll-based agent can be visibly distinguishable from and shinier than neighboring untreated living greenery. When a viewer is nearer than the minimum predefined viewing distance, a difference in shine and color between the treated living greenery and the untreated living greenery can be substantially unnoticeable.

20 Claims, 2 Drawing Sheets

100

(51) Int. Cl.
*A01G 7/00* (2006.01)
*C09D 5/00* (2006.01)
*C09D 5/14* (2006.01)
*C09D 157/10* (2006.01)
*A01D 34/835* (2006.01)
*B44C 1/22* (2006.01)
*B44F 7/00* (2006.01)
*A63C 19/00* (2006.01)
*A63C 19/06* (2006.01)

UNOBTRUSIVE MARKINGS USING A CHLOROPHYLL-BASED AGENT

CROSS-REFERENCE TO RELATED APPLICATIONS

This is a continuation in part application of PCT/US16/24930 titled "A CHLOROPHYLL-BASED AGENT FOR MARKING LIVING GREENERY" (Filed Mar. 30, 2016), which is incorporated by reference herein in its entirety.

BACKGROUND

The present invention relates to the field of botanical treatments and, more particularly, to unobtrusive markings made using a chlorophyll-based agent.

Marking living greenery like grass and shrubs is common practice for a variety of reasons, such as sports, orienteering, surveying, art, and advertising. Conventionally, these markings are applied to the living greenery using a semi-permanent chalk-like powder or a permanent paint. Unfortunately, most conventional means are destructive to the living greenery and/or its environment.

Further, markings made using conventional means are viewable by everyone and often distract or detract from the natural environment. For example, sponsor or advertisement markings on a sports field are viewable by fans in the stands and the players. As the players move around the field, the markings can be distracting, so the quantity and placement of the markings are often limited or disallowed. This results in large areas of the sports field that are deemed unusable for this purpose, which translates into lost revenue opportunities.

Similarly, living greenery is routinely marked by survey crews to identify boundaries, the location of utility lines, and the like. In addition to paints, a variety of ties and stake markers are often used so as to not destroy the living greenery with paint. However, ties and stake markers are easily removed or deteriorated by environmental conditions. For example, a neon orange plastic strip tied to a tree branch is susceptible to damage from sun, rain, and wind. Further, such markings are non-biodegradable and disrupt the natural beauty of the surroundings.

Therefore, what is needed is a permanent means of marking living greenery that is only noticeable from a distance by viewers and is non-detrimental to the overall health of the living greenery and its environment.

BRIEF SUMMARY

One aspect of the present invention can include an improved advertising system. Such a system can include a location having a substantially large expanse of living greenery, a predetermined design for an advertisement, and a chlorophyll-based agent. The location can be observable by viewers at a predefined minimum viewing distance. The chlorophyll-based agent can be used to paint the predetermined design on the living greenery. The chlorophyll-based agent can be non-detrimental to the health of the living greenery. The predetermined design painted on the living greenery with the chlorophyll-based agent can be only viewable by viewers at the predefined minimum viewing distance. Living greenery treated with the chlorophyll-based agent can be visibly distinguishable from and shinier than neighboring untreated living greenery. When a viewer is nearer than the minimum predefined viewing distance, a difference in shine and color between the treated living greenery and the untreated living greenery can be substantially unnoticeable.

Another aspect of the present invention can include an improved sports venue that includes a sports field comprised of living greenery upon which a sport is played and decorations painted onto the living greenery of the sports field with a chlorophyll-based agent. The chlorophyll-based agent can be non-detrimental to the health of the living greenery. The decoration can be substantially unnoticeable by persons involved with the sport on the sports field.

Yet another aspect of the present invention can include an improved survey system that includes a survey location having an area of living greenery and survey markings made on the living greenery with chlorophyll-based agent. The location can be observable by viewers at a predefined minimum viewing distance. The chlorophyll-based agent can be non-detrimental to the health of the living greenery. The survey markings can be only viewable by viewers at the predefined minimum viewing distance. Living greenery treated with the chlorophyll-based agent can be visibly distinguishable from and shinier than neighboring untreated living greenery. When a viewer is nearer than the minimum predefined viewing distance, a difference in shine and color between the treated living greenery and the untreated living greenery can be substantially unnoticeable.

DETAILED DESCRIPTION

The present invention discloses an unobtrusive way to paint advertisements on areas of living greenery like a sports field. An advertisement or sponsor logo can be painted on living greenery using a chlorophyll-based agent. The chlorophyll-based agent can create a shiny, green-tinted coating that is viewable from a predefined viewing distance and is unnoticeable by those on the living greenery.

As will be appreciated by one skilled in the art, aspects of the present invention may be embodied as a system or method. Aspects of the present invention are described below with reference to flowchart illustrations and/or block diagrams of methods and apparatus (systems) according to embodiments of the invention.

Figure 1:
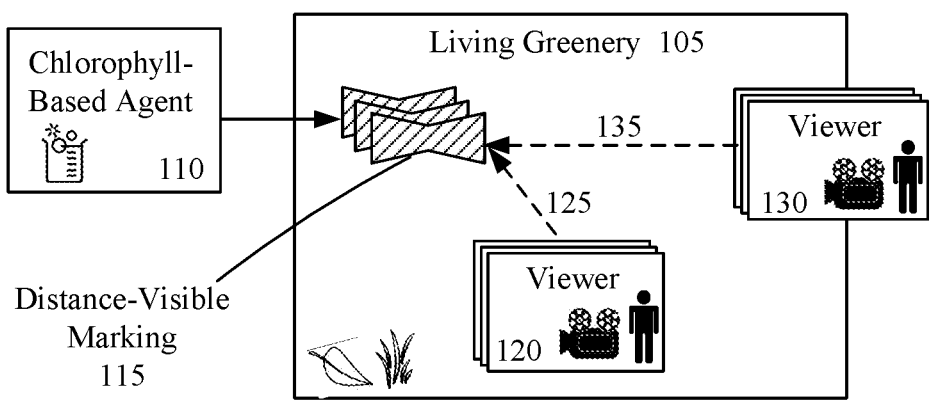
FIG. 1 is a block diagram of a system illustrating the use of distance-visible markings made with a chlorophyll-based agent upon living greenery in accordance with embodiments of the inventive arrangements disclosed herein.

FIG. 1 is a block diagram of a system 100 illustrating distance-visible markings 115 made with a chlorophyll-based agent 110 upon living greenery 105 in accordance with embodiments of the inventive arrangements disclosed herein. Living greenery, as used herein, can refer to green-colored plants and/or plant elements.

The living greenery 105 can represent an area of green vegetation and/or plant life. Examples of living greenery can include, but are not limited to, ground cover plants, grass, moss, ivy, the foliage of a tree, the foliage of a bush, the foliage of a shrub, the foliage of a plant, a non-woody plant stem, and the like.

The living greenery 105 can be a part of and/or associated with a different types of locations, outdoor as well as indoor. Examples of such locations can include, but are not limited to, a sports venue (e.g., soccer field, baseball field, etc.), an entertainment venue, an agricultural area, a forest, a nature park, a pasture, a rainforest, and the like.

The chlorophyll-based agent 110 can be product that utilizes natural chlorophyll to create a distance-visible marking 115 on the living greenery 105 like that taught in PCT/US15/23345. The distance-visible marking 115 can be a shiny, green-tinted coating that is only visible to a viewers 130 at a predefined viewing distance 135. The distance-visible markings 115 can be used in a variety of configurations or designs for various reasons. For example, the distance-visible markings 115 can represent an advertisement for a business on a sports field or a boundary for a habitat survey being conducted in a wildlife area.

The chlorophyll-based agent 110 can be permanent, yet non-detrimental to the health of the underlying living greenery 105. That is, unlike conventional paints and dyes used on living greenery 105, the chlorophyll-based agent 110 can allow the living greenery 120 of the distance-visible markings 115 to function normally. This can be achieved through a unique formulation that allows the formation of voids in the coating of the chlorophyll-based agent 110 that allow sunlight to reach the leaf without reducing the effectiveness of the chlorophyll-based agent 110.

For example, grass 105 treated with the chlorophyll-based agent 110 can continue to grow naturally. A conventional grass paint can inhibit the ability of the grass 105 to breathe and photosynthesize, causing the grass 105 to die.

Like many conventional marking treatments, the chlorophyll-based agent 110 can be removed from the living greenery 105 via removal or pruning. For example, a logo 115 applied to grass 105 can be removed from a sports field when the portion of the grass blades 105 coated by the chlorophyll-based agent 110 are severed during mowing.

The chlorophyll-based agent 110 can be applied to the living greenery 105 using an application means that is commensurate with the specific formulation of the chlorophyll-based agent 110. Examples of application means can include, but are not limited to, a brush, a spray can or bottle, a pneumatic sprayer, a roller, a machine that utilizes one or more of these means, and the like. One liter of the chlorophyll-based agent 110 can be used to coat 16 square meters of living greenery 105.

Viewers 120 and/or 130 can be expected to observe and/or participate in activities performed upon the living greenery 105. Viewers 120 and 130 can represent optical receivers like human eyes, photographic cameras and/or video cameras. Depending on their current position upon or around the living greenery 105, the viewers 120 and 130 can have a respective viewing distance 125 and 135 to the distance-visible marking 115.

Viewers 120 can represent those people or optical equipment that are on the living greenery 105. For example, viewers 120 can be the players of sport, television cameras on a sports field, or the visitors to a state park. To emphasize the novelty of the distance-visible markings 115 made with the chlorophyll-based agent 110, viewers 120 can have a viewing distance 125 that is closer than the minimum viewable distance of the chlorophyll-based agent 110, about one meter, like people walking or running on a field. At this viewing distance 125, the distance-visible marking 115 can be substantially unobtrusive to the viewers 120. That is, the distance-visible marking 115 can go unnoticed by viewers 120 closer than the minimum viewing distance 125.

Viewers 130 can represent those people or optical equipment that are located on or around the living greenery 105, but at a greater viewing distance 135 from the distance-visible marking 115 than viewers 120 that is within the viewing range (i.e., between 1 meter and 549 meters) of the chlorophyll-based agent 110. For example, viewers 130 can represent sports fans in the stands of an arena, television cameras in the stands of the sports arena, or a low-flying aircraft.

At this viewing distance 135 and with a viewing angle of at least 20°, these viewers 130 can see the distance-visible markings 115 and any pattern, image, and/or text that the markings 115 represent.

While the concepts taught in system 100 may appear ordinary, it can be important to emphasize the novelty that this change in visibility at different viewing distances 125 and 135 provides. Conventional marking agents for living greenery 105 can be visible to all viewers 120 and 130 at most viewing distances 125 and 135, though clarity of the design may vary. For example, when the name 115 of a team sponsor is applied to a soccer field 105 using conventional paint, the name 115 can be clearly seen at distance 135 by people 130 in the stands and by cameras 130. Players 120 on the field can also see the painted grass 115 on the field 105, though they may be unable to discern the name. This painted grass 115 can be distracting to the players 120, so such markings may be limited or disallowed.

Applying the sponsor name 115 using the chlorophyll-based agent 110 can result in the people 130 in the stands and cameras 130 being able to view the name 115 at a distance 135 without the players 120 on the field 105 noticing the name 115. Since the chlorophyll-based agent 110 is not distracting to the players 120, areas of the field 105 can be used for advertising, increasing revenue for the team and/or field.

Figure 2:
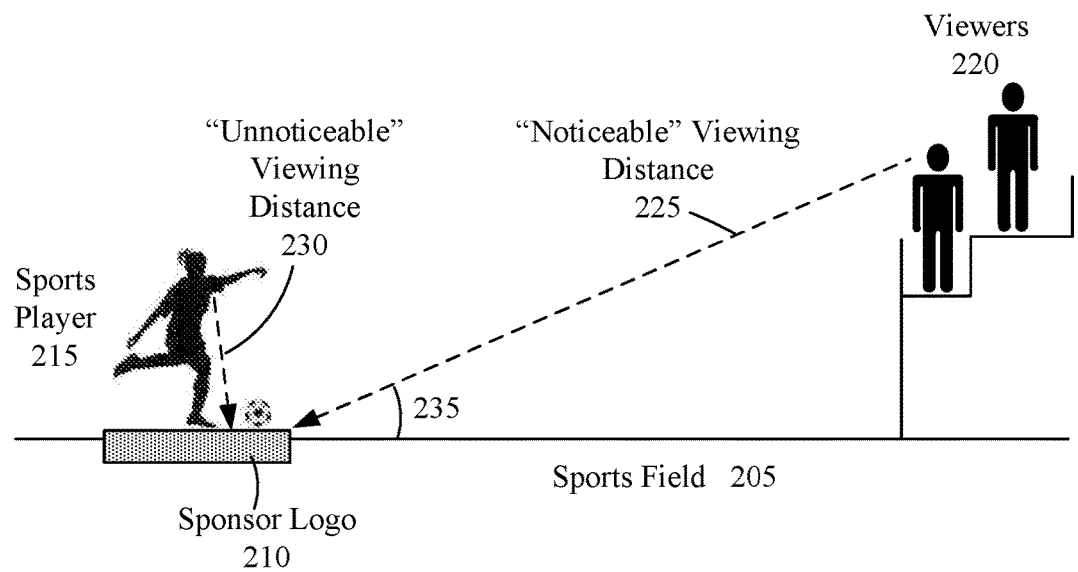
FIG. 2 is a diagram graphically illustrating the use of markings made with the chlorophyll-based agent in a sports setting in accordance with embodiments of the inventive arrangements disclosed herein.

FIG. 2 is a diagram 200 graphically illustrating the use of markings made with the chlorophyll-based agent in a sports setting in accordance with embodiments of the inventive arrangements disclosed herein. Diagram 200 can represent a specific embodiment of system 100.

The sports field 205 can be comprised of living greenery, most likely a variety of grass. At one or more locations, a sponsor logo 210 can be applied to the grass of the sports field 205 using the chlorophyll-based agent. Alternately, the sponsor logo 210 can be replaced with the team name or any other desired element.

When a sporting event is played on the sports field 205, one or more sports players 215 can move around on the sports field 205. It can be likely for a sports player 215 to pass over an area having a sponsor logo 210 during this event. The sports player's 215 field of vision can include the sponsor logo 210. The viewing distance 230 (i.e., the distance from their eyes to the logo 210) of the sports player 215 can be relatively small (i.e., around one meter), allowing the logo 210 to appear unnoticeable to the sports player 215, since this is within the "unnoticeable" range of the chlorophyll-based agent.

Players 215 down field, such as a goalie, would also not notice the same logo 210, despite being outside the "unnoticeable" range, because such a player 215 would have a viewing angle 235 smaller than 20°. Therefore, logos 210 or other designs painted on the sports field 205 with the chlorophyll-based agent can be virtually invisible to the players 215.

Viewers 220 of the sporting event can be situated farther away from and above the sports field 205 can be able to see the various sponsor logos 210. Viewers 220 standing on the field 205 or at a height that does not provide the minimum 20° viewing angle 235 can be unable to adequately view the sponsor logos 210.

Figure 3:
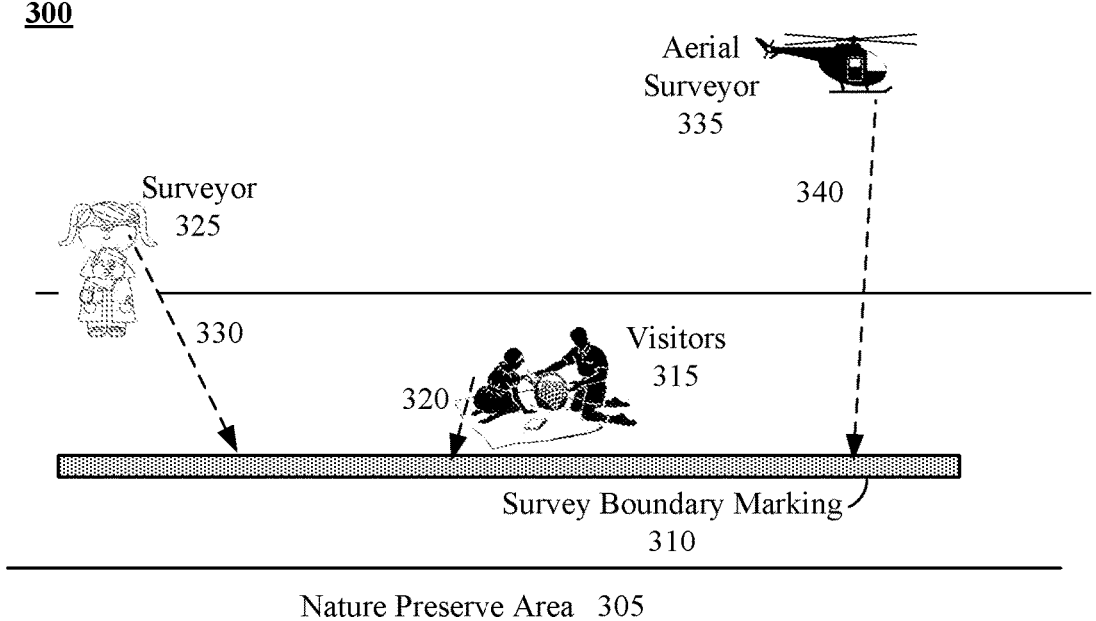
FIG. 3 is a diagram graphically illustrating the use of markings made with the chlorophyll-based agent in a survey setting in accordance with embodiments of the inventive arrangements disclosed herein.

FIG. 3 is a diagram 300 graphically illustrating the use of markings made with the chlorophyll-based agent in a survey setting in accordance with embodiments of the inventive arrangements disclosed herein. Diagram 300 can represent a specific embodiment of system 100.

In diagram 300, a habitat or wildlife survey can be conducted within a nature preserve area 305 like a state park or forest preserve. The nature preserve area 305 can include areas having living greenery, such as grass, undergrowth, shrubs, and other plant-life. The boundaries 310 of the nature preserve area 305 being surveyed can be marked using the chlorophyll-based agent.

Since many nature preserve areas 305 are open to the public, it can be possible for visitors 315 to the nature preserve area 305 to walk through and/or utilize space within the survey area. In this example, visitors 315 can have a picnic in an open field that is within the survey boundary markings 310. As in the illustration 200, the viewing distance 320 (i.e., the distance from their eyes to the boundary marking 310) of the visitors 315 can be relatively small (i.e., around one meter), allowing the boundary marking 310 to be relatively unnoticeable to the visitors 315.

A surveyor 325 conducting the survey on foot can view the survey boundary markings 310, provided that their viewing distance 330 to the boundary marking 310 remains greater than the minimum viewing distance of the chlorophyll-based agent and their a viewing angle does not drop below than 20°. Similarly, an aerial surveyor 335, person and/or camera, can view the survey boundary markings 310 from a much greater viewing distance 340 that does not exceed the maximum viewing range of the chlorophyll-based agent, about 549 meters, such as a helicopter or small aircraft.

This example can emphasize how markings 310 made with the chlorophyll-based agent are not only unobtrusive to the visitors 315, but the markings also do not detract from the beauty of the nature preserve area 305. That is, even if the visitors 315 move to a position where they are able to view the boundary markings 310, the subtle green tint of the chlorophyll-based agent can be more aesthetically pleasing than conventional marking products.

Other contemplated embodiments of the present invention can capitalize upon the non-destructive nature of the chlorophyll-based agent for use at longer distances, like the aerial surveyor 335. For example, the chlorophyll-based agent can be used to mark landing zones and directions for low-altitude outdoor sports like hang gliding and soaring. These permanent, but non-destructive markings can increase reusability, saving an instructor or operator time.

Another, related embodiment can utilize the chlorophyll-based agent as a landscaping treatment to boost highlights in an area or display.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:

1. An advertising system comprising:
a sports field having a substantially large expanse of living grass, wherein the sports field is observable by a plurality of viewers at a distance from the sports field;
a predetermined design for an advertisement; and
a chlorophyll-based agent to paint the predetermined design on the living grass,
wherein the chlorophyll-based agent is non-detrimental to a health of the living grass,
wherein when the predetermined design is painted on the living grass with the chlorophyll-based agent, the living grass treated with the chlorophyll-based agent to create an image of the predetermined design in the living grass bye visibly distinguishing treated living grass from and shinier than neighboring untreated living grass only at a predetermined distance and at a height creating a minimum viewing angle,
wherein the predetermined design is not viewable by a sport player located on the sports field, as the sports player is at least one of nearer than a minimum predefined viewing distance and at a height creating a line of sight from horizontal that is below the minimum viewing angle, the minimum predefined viewing distance is a distance along a line of sight from horizontal that is at or greater than the minimum viewing angle where a difference in shine and color between treated living grass and untreated living grass changes from substantially unnoticeable to noticeable,
wherein the predetermined design is viewable by the plurality of viewers located distant from the sports field as the plurality of viewers are located farther than the minimum predefined viewing distance and at a height creating a line of sight from horizontal that is at or greater than the minimum viewing angle.

2. The advertising system of claim 1, wherein the predetermined design is text.

3. The advertising system of claim 1, wherein the predetermined design is a graphical image.

4. The advertising system of claim 1, wherein the predetermined design is a line.

5. The advertising system of claim 1, wherein the predetermined design geometric shape.

6. The advertising system of claim 1, wherein the chlorophyll-based agent is applied using at least one of a brush, a roller, a sprayer, an aerosol can, and a machine that utilizes at least one such means.

7. The advertising system of claim 1, wherein one viewer of the plurality of viewers is one of: a human being, a photographic camera, and a video camera.

8. The advertising system of claim 1, wherein the minimum viewing angle is 20 degrees.

9. A sports venue comprising:
a sports field upon which a sport is played, the sports field substantially comprising living grass; and
at least one decoration painted onto the living grass of the sports field using a chlorophyll-based agent,
wherein the chlorophyll-based agent is non-detrimental to a health of the living greenery,
wherein the at least one decoration is substantially unnoticeable by persons involved with the sport e the persons are located on the sports field,
wherein the at least one decoration is substantially noticeable by a plurality of viewers located off the sports field, wherein the decoration is only viewable by the plurality of viewers located at a predefined minimum viewing distance and at a height creating a minimum viewing angle, wherein the predetermined minimum viewing distance is a minimum distance from the decoration where the living grass painted with the chlorophyll-based agent is visibly distinguishable from and shinier than neighboring untreated living grass, where the living grass painted with the chlorophyll-based agent is visibly indistinguishable from and shinier than neighboring untreated living grass when viewed at least one of from a distance less than the predetermined minimum viewing distance and at a height creating a line of sight from horizontal that is below the minimum viewing angle.

10. The sports venue of claim 9, wherein the predefined minimum viewing angle is 20 degrees.

11. The sports venue of claim 9, wherein the decoration comprises at least one of: text, a geometric shape, a line, and a graphical image.

12. A design presentation system comprising:
a sports field having a substantially large expanse of living grass, wherein the sports field is observable by a plurality of viewers at a distance from the sports field;
a design; and
a chlorophyll-based agent to paint the design on the living grass of the sports field,
wherein the chlorophyll-based agent is non-detrimental to a health of the living grass of the sports field,
wherein when the design is painted on the living grass with the chlorophyll-based agent, the living grass treated with the chlorophyll-based agent to create an image of the design in the living grass by visibly distinguishing treated living grass from and shinier than neighboring untreated living grass only at a predetermined distance and at a height creating a minimum viewing angle,
wherein the design is not viewable by a sport player located on the sports field, as the sports player is at least one of nearer than a minimum predefined viewing distance and at a height creating a line of sight from horizontal that is below the minimum viewing angle, the minimum predefined viewing distance is a distance along a line of sight from horizontal that is at or greater than the minimum viewing angle, where a difference in shine and color between treated living grass and untreated living grass changes from substantially unnoticeable to noticeable,
wherein the design is viewable by the plurality of viewers located distant from the sports field as the plurality of viewers are located farther than the minimum predefined viewing distance and at a height creating a line of sight from horizontal that is at or greater than the minimum viewing angle.

13. The design presentation system of claim 12, wherein the design is text.

14. The design presentation system of claim 12, wherein the design is a graphical image.

15. The design presentation system of claim 12, wherein the design is a line.

16. The design presentation system of claim 12, wherein the design is a geometric shape.

17. The design presentation system of claim 12, wherein the chlorophyll-based agent is applied using at least one of a brush, a roller, a sprayer, an aerosol can, and a machine that utilizes at least one such means.

18. The design presentation system of claim 12, wherein one viewer of the plurality of viewers is one of: a human being, a photographic camera, and a video camera.

19. The design presentation system of claim 12, wherein the minimum viewing angle is 20 degrees.

20. The design presentation system of claim 12, wherein the sports field is one of a soccer field or a baseball field.

* * * * *